L. C. AMBERSON.
HEADLIGHT SHIFTING MECHANISM.
APPLICATION FILED JUNE 18, 1910.

981,350.

Patented Jan. 10, 1911.

2 SHEETS—SHEET 1.

WITNESSES
Samuel Payne
R. H. Butler

INVENTOR
L. C. Amberson
by N. C. Evert &co.
Attorneys.

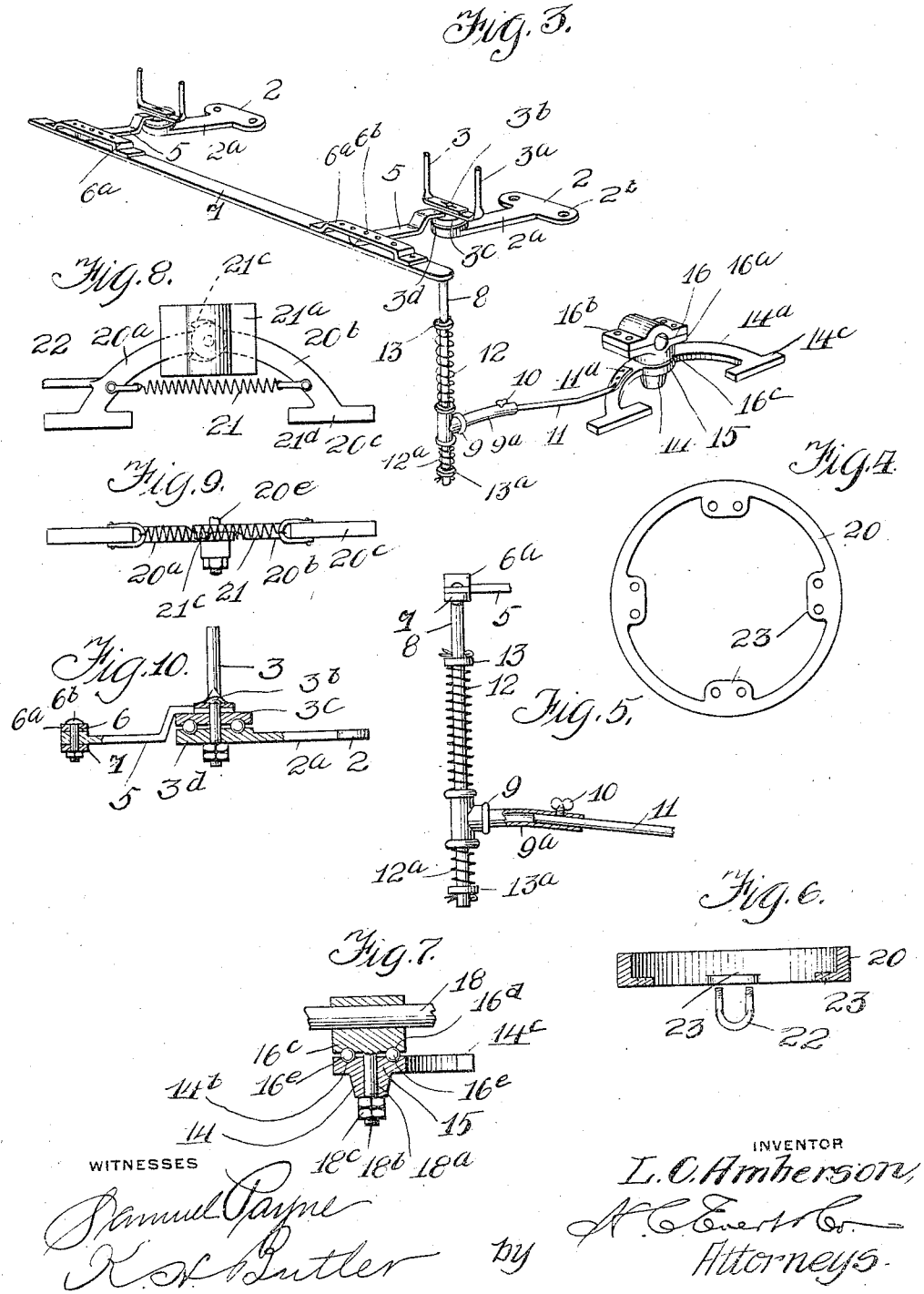

UNITED STATES PATENT OFFICE.

LINTON C. AMBERSON, OF NEW CASTLE, PENNSYLVANIA.

HEADLIGHT-SHIFTING MECHANISM.

981,350.     Specification of Letters Patent.     Patented Jan. 10, 1911.

Application filed June 18, 1910. Serial No. 567,614.

*To all whom it may concern:*

Be it known that I, LINTON C. AMBERSON, a citizen of the United States of America, residing at New Castle, in the county of Lawrence and State of Pennsylvania, have invented certain new and useful Improvements in Headlight-Shifting Mechanism, of which the following is a specification, reference being had therein to the accompanying drawing.

This invention relates to head light shifting mechanism for motors and other vehicles and has for its object to provide a mechanism in a manner as hereinafter set forth for automatically shifting a headlight from the front wheels of a vehicle during the steering of the wheels.

Further objects of the invention are to provide a headlight shifting mechanism which shall be comparatively simple in its construction and arrangement, strong, durable, efficient in its use, readily connected to a motor or other vehicle, and comparatively inexpensive to manufacture.

With the foregoing and other objects in view the invention consists of the novel construction, combination and arrangement of parts as hereinafter more specifically described and illustrated in the accompanying drawings wherein is shown the preferred embodiment of the invention but it is to be understood that changes, variations and modifications can be resorted to which come within the scope of the claims hereunto appended.

Figure 1:
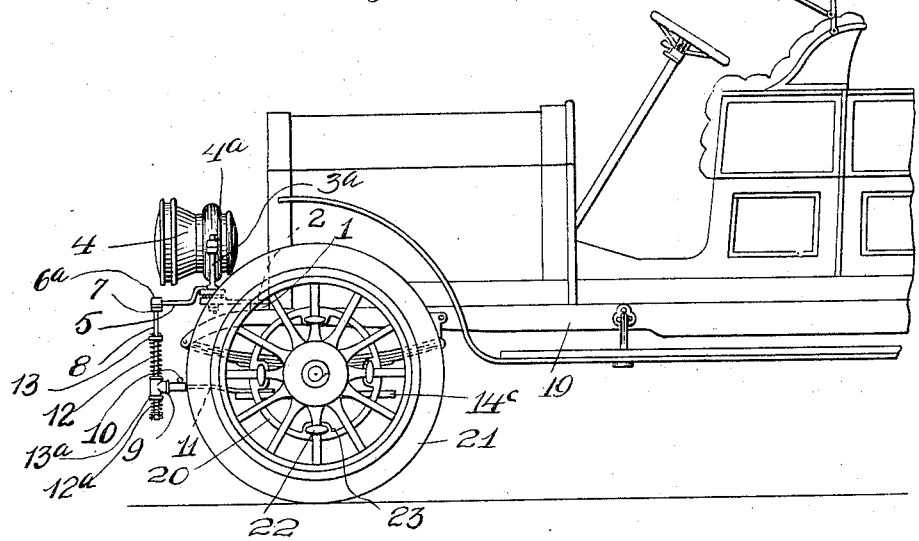
Figure 2:
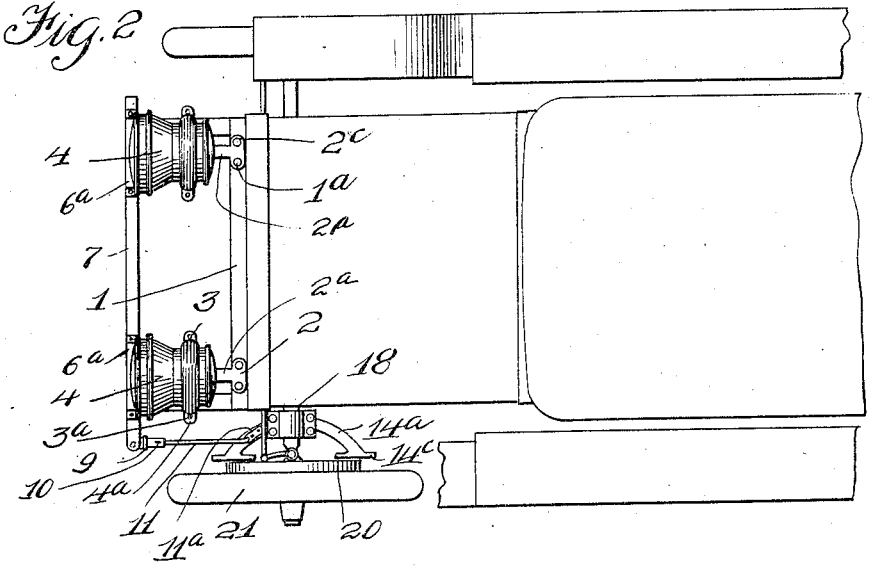

In the drawings wherein like reference characters denote corresponding parts throughout the several views: Figure 1 is a side elevation of a portion of a motor showing the adaptation therewith of a headlight shifting mechanism in accordance with this invention. Fig. 2 is a plan of a portion of a motor showing the adaptation therewith of a headlight shifting mechanism in accordance with this invention. Fig. 3 is a perspective view of the headlight shifting mechanism. Fig. 4 is an elevation of the operating element carried by one of the front wheels of the vehicle for actuating the shifting mechanism during the steering of the wheel. Fig. 5 is an enlarged side elevation of one of the yieldable supporting posts of the mechanism. Fig. 6 is a transverse sectional view of the operating element. Fig. 7 is an enlarged vertical sectional view of the swivel support for the actuating member, and, Figs. 8, 9 and 10 are detail views of a modified form of actuating member.

Referring to the drawings in detail, 1 denotes the front beam of the frame of a motor vehicle and which has connected thereto as at $1^a$ a pair of forwardly projecting T-shaped brackets. The head of each of the brackets is indicated by the reference character 2 and the arm by the reference character $2^a$. Each of the heads 2 is provided with a plurality of openings $2^b$ through which extend hold-fast devices $2^c$ for securing the brackets to the beam 1. The T-shaped brackets constitute suspension means for adjustable pivoted supports for the headlights. Each of said supports consists of a pair of angle-shaped members 3, $3^a$ adjustably connected together by a pin and slot connection $3^b$. The lower arm of the member 3 is mounted upon the lower arm of the member $3^a$ and the said lower arms are adjustably connected together by the pin and slot connection $3^b$ whereby the said members 3, $3^a$ can be moved toward and away from each other when occasion so requires. The arm $3^a$ has fixed thereto a cylindrical extension $3^c$ which is loosely mounted in a cup $3^d$ formed on the free end of the arm $2^a$. The extension $3^c$ is capable of being shifted within the cup $3^d$ so as to angularly dispose the members 3, $3^a$ with respect to the arm $2^a$ or to return said members to normal position which is as shown in Fig. 3. Fixed to the extension $3^c$ is a forwardly-extending offset arm 5.

The headlights are indicated by the reference character 4 and each has connected thereto as at $4^a$ the members 3, $3^a$. The members 3, $3^a$ constitute supports for the headlights and further shift the headlights when the extensions $3^c$ are moved within the cup $3^d$. The extensions $3^c$ are shifted through the medium of the arms 5.

The reference character 7 denotes a horizontally-disposed bar arranged forwardly of the beam 1 and which is provided with a pair of apertured brackets $6^a$. Extending between the brackets $6^a$ and the bar 7 are the outer ends of the arms 5 and the said outer ends are pivotally connected to the brackets $6^a$ and bar 7 by the pin $6^b$. The bar 6 is capable of shifting transversely with respect to the vehicle and when shifted will move the arms 5 whereby the extensions $3^c$ are moved within the cups $3^d$ and the members 3, $3^a$ shifted to or from normal position and carry the headlights therewith. The bar 7 has one of its ends connected to a vertically extending post 8 which projects through a T-coupling 9 and the said post 8 is provided near its top with a collar 13 and near its bottom with a collar 13$^a$. Interposed between the collar 13 and the coupling 9 is a coil spring 12 and interposed between the T-coupling 9 and the collar 13$^a$ is a coil spring 12$^a$. The springs 12 and 12$^a$ surround the post 8 and constitute means whereby the post is yieldingly supported. Projecting from the T-coupling 9 is a sleeve 9$^a$ into which extends one end of a reach rod 11. That end of the rod 11 which projects into the sleeve 9$^a$ is fixedly secured in position through the medium of a set screw 10.

Projecting from the side frame 19 of the vehicle body is a pin 18 which extends through a bearing frame of the sections 16 and 16$^a$ connected together by the hold-fast devices 16$^b$. The section 16$^a$ is formed with a depending boss 16$^c$ having its lower face formed with a ball race 16$^d$ in which engages the bearing balls 16$^e$. The boss 16$^c$ centrally of its lower face is formed with a depending stem 18$^a$ having its lower end threaded as at 18$^b$ and provided with clamping nuts 18$^c$. Mounted upon the stem 18$^a$ and interposed between the nuts 18$^c$ and the bearing balls 16$^e$ is a head 14 of a segment-shaped actuating member. The upper face of the head 14 of the actuating member is provided with a groove 16$^b$ constituting a ball race in which extends the ball 16$^c$. By the foregoing arrangement the actuating member is swively supported in position. The actuating member not only includes the head 14 but also a pair of grooved arms 14$^a$ which are formed integral with and project from the head 14 as well as extend in opposite directions with respect to each other and each of said arms 14$^a$ is formed with a rectangular end 14$^c$. Connected to one of the arms 14$^a$ as at 11$^a$ is one end of the reach rod 11. The actuating member is interposed between the side of the vehicle and one of the front wheels 21. The said wheel 21 has secured to the inner side thereof an operating element in the form of an annulus 20 and which is provided with the inwardly-extending apertured lugs 23. Extending around the spokes of the wheel 21 and through the apertured lugs 23 are the clevises 22 for coupling the annulus 20 to the wheel 21. The annulus 20 is mounted in operative relation with respect to the actuating member so that when the wheel 21 is shifted either one of the rectangular ends 14$^c$ will be engaged by the annulus 20 whereby the actuating member will be shifted and the bar will be moved which in turn will shift the arms 5 and move the members 3, 3$^a$ thereby shifting the headlights.

From the foregoing construction and arrangement of parts it is evident that when the front wheels of the vehicle are steered, the headlights will be automatically shifted owing to the engagement of the annulus with one of the rectangular ends 14$^c$ of the arm 14$^a$.

In the modified form shown in Figs. 8 and 9 the actuating member is formed of two separate arms 20$^a$, 20$^b$, each provided with a rectangular end 20$^c$ and the said arms 20, 20$^a$ are pivotally mounted upon the stem 20$^e$ which depends from the bearing 21$^a$ supported upon the pin 18. The pivoted ends of the arms 20$^a$ and 20$^b$ are provided with lugs 21$^c$ for limiting the movement of said arms. The arms 20$^a$ and 20$^b$ are connected together by a spring 21$^a$. The reach rod which is indicated by the reference character 22 is connected to the arm 20$^a$. By forming the actuating member of a pair of arms connected together by a spring any injury from a sudden turning movement of the wheel 21 to the actuating member will be prevented.

What I claim is:

1. A headlight shifting mechanism comprising an angularly shiftable headlight support including a shifting arm therefor, a yieldingly supported bar pivotally connected to said arm and movable in the direction of its length for shifting said arm thereby adjusting said support, an actuating member, means for swively supporting the said member from a vehicle, connections between said bar and said member for moving the bar when said member is actuated, and an operating element carried by one of the front wheels of a vehicle and adapted to engage said member for actuating it during the steering of the front wheels of the vehicle whereby the headlight support is shifted.

2. A headlight shifting mechanism comprising an angularly shiftable headlight support including a pair of arms, a yieldingly supported bar pivotally connected to said arms and movable in the direction of its length for shifting said arms thereby adjusting said support, an actuating member including a pair of arms each having an enlarged rectangular free end, means for swively supporting said member from a vehicle, connections between said bar and said member for moving the bar when said member is actuated, and an operating element carried by one of the front wheels of a vehicle and adapted to engage the end of one of the arms of said member for actuating it during the steering of the front wheels of the vehicle whereby the headlight support is shifted.

3. A headlight shifting mechanism comprising an angularly shiftable headlight support including a pair of supporting members adapted to be connected to a headlight and adjustable with respect to each other and further including a shiftable arm therefor, a yieldingly supported bar pivotally connected to said arm and movable in the direction of its length for shifting said arm thereby adjusting said support, a pivotally-mounted actuating member, connections between said bar and said member for moving the bar when said member is actuated, and an operating element carried by one of the front wheels of a vehicle and adapted to engage said member for actuating it during the steering of the front wheels of the vehicle whereby the headlight support is shifted.

4. A headlight shifting mechanism comprising an angularly shiftable headlight support including a pair of supporting members adapted to be connected to a headlight and adjustable with respect to each other and further including a shiftable arm therefor, a yieldingly supported bar pivotally connected to said arms and movable in the direction of its length for shifting said arms thereby adjusting said support, a pivotally mounted actuating member, connections between said bar and said member for moving the bar when said member is actuated, and an operating element carried by one of the front wheels of a vehicle and adapted to engage said member for actuating it during the steering of the front wheels of the vehicle whereby the headlight support is shifted.

5. A headlight shifting mechanism comprising a pair of angularly shiftable headlight supports each including a shifting arm therefor, a yieldingly supported bar pivotally connected to said arms and movable in the direction of its length for shifting said arm thereby adjusting said support, a pivotally-mounted actuating member, connections between said bar and said member for moving the bar when said member is actuated, and an operating element carried by one of the front wheels of a vehicle and adapted to engage said member for actuating it during the steering of the front wheels of the vehicle whereby the headlight support is shifted.

6. A headlight shifting mechanism comprising a pair of angularly shiftable headlight supports each including a shifting arm therefor, a yieldingly supported bar pivotally connected to said arms and movable in the direction of its length for shifting said arms thereby adjusting said support, a pivotally-mounted actuating member, connections between said bar and said member for moving the bar when said member is actuated, and an operating element carried by one of the front wheels of a vehicle and adapted to engage said member for actuating it during the steering of the front wheels of the vehicle whereby the headlight support is shifted.

In testimony whereof I affix my signature in the presence of two witnesses.

LINTON C. AMBERSON.

Witnesses:
MAX H. SROLOVITZ,
K. H. BUTLER.